(12) United States Patent
Kato et al.

(10) Patent No.: US 11,279,332 B2
(45) Date of Patent: Mar. 22, 2022

(54) BRAKING FORCE CONTROL APPARATUS FOR VEHICLE

(71) Applicant: TOYOTA JIDOSHA KABUSHIKI KAISHA, Toyota (JP)

(72) Inventors: Hidehisa Kato, Sunto-gun (JP); Masahiro Hara, Gotemba (JP); Yuji Yoshii, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 144 days.

(21) Appl. No.: 16/151,915

(22) Filed: Oct. 4, 2018

(65) Prior Publication Data

US 2019/0106090 A1 Apr. 11, 2019

(30) Foreign Application Priority Data

Oct. 6, 2017 (JP) .............................. JP2017-196298
Sep. 4, 2018 (JP) .............................. JP2018-165064

(51) Int. Cl.
*B60T 8/58* (2006.01)
*B60T 8/176* (2006.01)
(Continued)

(52) U.S. Cl.
CPC .............. *B60T 8/176* (2013.01); *B60T 7/042* (2013.01); *B60T 7/22* (2013.01); *B60T 8/1755* (2013.01);
(Continued)

(58) Field of Classification Search
None
See application file for complete search history.

(56) References Cited

U.S. PATENT DOCUMENTS

| 5,813,732 A | 9/1998 | Monzaki et al. |
| 6,443,541 B1 | 9/2002 | Aizawa |

(Continued)

FOREIGN PATENT DOCUMENTS

| JP | 2012116300 A | 6/2012 |
| JP | 2012-153266 A | 8/2012 |

(Continued)

OTHER PUBLICATIONS

Office Action dated Oct. 8, 2020 issued in U.S. Appl. No. 16/151,514.
(Continued)

*Primary Examiner* — Yuen Wong
*Assistant Examiner* — Hongye Liang
(74) *Attorney, Agent, or Firm* — Sughrue Mion, PLLC (57) ABSTRACT

A braking force control apparatus is provided which has an upstream braking actuator for generating an upstream pressure common to four wheels, a downstream braking actuator individually controlling braking pressure supplied to braking force generating devices of the wheels using the upstream pressure, and a control unit. When the downstream braking actuator is abnormal and the upstream pressure can be supplied to the braking force generating devices, but a braking pressure of any one of the wheels cannot be normally controlled, the control unit selects a control mode on the pressure increasing side out of the front wheel control modes, selects a control mode on the pressure increasing side out of the rear wheel control modes, selects a control mode on the pressure decreasing side out of the two selected control modes as a prescribed control mode, and controls the upstream pressure in the prescribed control mode.

5 Claims, 4 Drawing Sheets

(51) Int. Cl.
*B60T 8/1755* (2006.01)
*B60T 8/24* (2006.01)
*B60T 13/58* (2006.01)
*B60T 8/94* (2006.01)
*B60T 13/14* (2006.01)
*B60T 7/22* (2006.01)
*B60T 7/04* (2006.01)
*B60T 13/68* (2006.01)
*B60T 13/66* (2006.01)
*B60T 13/16* (2006.01)
*B60T 8/40* (2006.01)

(52) U.S. Cl.
CPC ............... *B60T 8/246* (2013.01); *B60T 8/58* (2013.01); *B60T 8/94* (2013.01); *B60T 13/146* (2013.01); *B60T 13/58* (2013.01); *B60T 13/662* (2013.01); *B60T 13/686* (2013.01); *B60T 8/4081* (2013.01); *B60T 13/161* (2013.01); *B60T 2201/02* (2013.01); *B60T 2250/04* (2013.01); *B60T 2270/10* (2013.01); *B60T 2270/304* (2013.01); *B60T 2270/306* (2013.01); *B60T 2270/404* (2013.01); *B60T 2270/406* (2013.01); *B60T 2270/413* (2013.01); *B60T 2270/82* (2013.01)

(56) References Cited

U.S. PATENT DOCUMENTS

| | | | |
|---|---|---|---|
| 7,255,407 | B2 | 8/2007 | Hamada et al. |
| 8,007,056 | B2 | 8/2011 | Ohkubo et al. |
| 9,090,235 | B2 | 7/2015 | Wantanabe |
| 9,505,393 | B2 | 11/2016 | Watanabe |
| 2010/0270855 | A1* | 10/2010 | Sawada ................ B60T 8/1766 303/113.2 |
| 2013/0231840 | A1 | 9/2013 | Wantanabe |
| 2017/0182990 | A1 | 6/2017 | Ninoyu et al. |
| 2019/0106091 | A1 | 4/2019 | Kato |

FOREIGN PATENT DOCUMENTS

| | | | |
|---|---|---|---|
| JP | 2012153266 | * | 8/2012 |
| JP | 2015-143058 | A | 8/2015 |
| JP | 2017-052305 | A | 3/2017 |

OTHER PUBLICATIONS

Office Action dated May 5, 2020 issued in U.S. Appl. No. 16/151,514.
Office Action dated Dec. 19, 2019 issued in U.S. Appl. No. 16/151,514.

* cited by examiner

BRAKING FORCE CONTROL APPARATUS FOR VEHICLE

CROSS-REFERENCE TO RELATED APPLICATION

The disclosures of Japanese Patent Applications No. JP2017-196298 filed on Oct. 6, 2017 and No. JP2018-165064 filed on Sep. 4, 2018 are incorporated by reference in their entirety.

BACKGROUND

1. Technical Field

The present disclosure relates to a braking force control apparatus for a vehicle such as an automobile.

2. Description of the Related Art

For example, as described in Japanese Patent Application Laid-open Publication No. 2012-153266, a braking force control apparatus having an upstream braking actuator that generates a common upstream pressure for left and right front wheels and left and right rear wheels, a downstream braking actuator, and a control unit that controls these actuators are known. The upstream braking actuator includes a master cylinder device driven by a driver's braking operation. The downstream braking actuator includes a pressure increasing-holding valve and a pressure decreasing valve provided corresponding to each wheel, and controls a braking pressure supplied to a braking force generating device of each wheel using the upstream pressure by the pressure increasing-holding valve and the pressure decreasing valve.

Anti-skid control is as well performed in a vehicle equipped with a braking force control apparatus having an upstream braking actuator and a downstream braking actuator so that a braking slip of each wheel does not become excessive. In the anti-skid control, a braking pressure supplied to a braking force generating device of a wheel having a large braking slip is individually controlled by the corresponding pressure increasing-holding valve and pressure decreasing valve.

If an abnormality occurs in a pressure increasing-holding valve or a pressure decreasing valve of any one of the wheels, a braking pressure of the relevant wheel cannot be normally controlled. In a conventional braking force control apparatus, for example, when an abnormality occurs in a pressure decreasing valve of any one of the wheels and it becomes impossible to reduce the braking pressure of the relevant wheel, the anti-skid control is stopped. Therefore, it is impossible to prevent a braking slip of the wheel from becoming excessive in a situation where a braking operation amount of a driver is excessive.

Even if an abnormality occurs in the downstream braking actuator, when the abnormality is an abnormality that allows to supply the upstream pressure from the upstream braking actuator to the braking force generating devices of the respective wheels but cannot reduce a braking pressure of any one of the wheels (referred to as "specific abnormality" as necessary), it is possible to reduce a possibility that the braking slips of the wheels become excessive by controlling the upstream pressure. Conventionally, no study has been made to reduce a possibility that a braking slip of a wheel becomes excessive by the control of the upstream pressure when the specific abnormality occurs in the downstream braking actuator. There is neither description nor suggestion in the above-mentioned publication.

SUMMARY

The present disclosure provides a braking force control apparatus for a vehicle which is improved to reduce a possibility that a braking slip of a wheel becomes excessive by the control of an upstream pressure when a specific abnormality in which the upstream pressure can be supplied to braking force generating devices but a braking pressure of a wheel cannot be reduced occurs in the downstream braking actuator.

According to the present disclosure, a braking force control apparatus for a vehicle is provided which has an upstream braking actuator that includes a master cylinder device that is driven by braking operation of a driver and generates a common upstream pressure for left and right front wheels and left and right rear wheels, a downstream braking actuator that individually controls braking pressures supplied to braking force generating devices of the left and right front wheels and the left and right rear wheels using the upstream pressure, and a control unit for controlling the upstream braking actuator and the downstream braking actuator, the control unit being configured, when an anti-skid control start condition is satisfied for any one of the wheels, to control the downstream braking actuator in control modes of a pressure increasing mode, a pressure holding mode and a pressure decreasing mode so that a degree of braking slip of the relevant wheel falls within a predetermined range until an anti-skid control ending condition is satisfied, and to control the downstream braking actuator in a non-control mode so that braking pressures of the wheels other than the relevant wheel become values corresponding to a braking operation amount of the driver.

The upstream braking actuator is configured to control the upstream pressure in the control modes of a pressure increasing mode, a pressure holding mode, a pressure decreasing mode and a non-controlling mode, and to set the upstream pressure to a pressure in the master cylinder device in the non-control mode.

The control unit is configured, in selecting the control mode on the pressure increasing side, a priority of selection being set higher in the order of the pressure increasing mode, the pressure holding mode, the pressure decreasing mode and the non-control mode, and in selecting the control mode on the pressure decreasing side, the priority of selection being set higher in the order of the pressure decreasing mode the pressure holding mode, the pressure increasing mode, and the non-control mode, to select a control mode on the pressure increasing side out of the control modes of the left and right front wheels, to select a control mode on the pressure increasing side out of the control modes of the left and right rear wheels, to select a control mode on the pressure decreasing side out of the two selected control modes as a prescribed control mode, and to control the upstream braking actuator so that the upstream pressure is controlled in the prescribed control mode when a specific abnormality in which the upstream pressure can be supplied from the upstream braking actuator to the braking force generating device of each wheel but a braking pressure supplied to braking force generating device of any one of the wheels cannot be reduced occurs in the downstream braking actuator.

According to the above configuration, when a specific abnormality occurs in the downstream braking actuator, a control mode on the pressure increasing side is selected out of the control modes of the left and right front wheels, a control mode on the pressure increasing side is selected out of the control modes of the left and right rear wheels, and a control mode on the pressure decreasing side out of the two selected control modes is selected as a prescribed control mode. Further, the upstream pressure is controlled in the prescribed control mode.

Therefore, as compared to where the downstream braking actuator is set to the non-control mode and the braking force generating devices of the wheels are connected with the master cylinder device when a specific abnormality occurs in the downstream braking actuator, it is possible to reduce a possibility that the braking pressures become excessive and braking slips of the wheels become excessive in a situation where a braking operation amount of a driver is excessive.

Further, as compared to where control modes on the pressure decreasing side are selected out of the control modes of the left and right front wheels and the left and right rear wheels, and a control mode on the pressure decreasing side is selected out of the two selected control modes so as to reduce a possibility that braking slips of wheels become excessive, a braking force of the entire vehicle can be increased. Conversely, as compared to where control modes on the pressure increasing side are selected out of the control modes of the left and right front wheels and the left and right rear wheels, and a control mode on the pressure increasing side is selected out of the two selected control modes, a braking force of the entire vehicle can be decreased. Therefore, it is possible to reduce a possibility that the stability of the vehicle deteriorates due to an excessive braking force of the entire vehicle while satisfying a braking request of the driver as much as possible.

In either selection of a control mode on the pressure increasing side and on the pressure decreasing side, when the two control modes to be selected are the same, the control mode is selected.

In another aspect of the present disclosure, the control unit is configured to select a control mode on the pressure decreasing side out of the left and right front wheels, to select a control mode on the pressure increasing side out of the control modes of the left and right rear wheels, to select a control mode on the pressure decreasing side out of the two selected control modes as a prescribed control mode, and to control the upstream braking actuator so that the upstream pressure is controlled in the prescribed control mode when a running state of the vehicle is unstable and the vehicle is not turning.

According to the above aspect, when a running state of the vehicle is unstable and the vehicle is not turning, a control mode on the pressure decreasing side is selected out of the control modes of the left and right front wheels, a control mode on the pressure increasing side is selected out of the control modes of the left and right rear wheels, and a control mode on the pressure decreasing side is selected out of the two selected control modes as a prescribed control mode. Therefore, it is possible to increase a braking force of the rear wheels and to effectively satisfy a braking request of the driver as compared to where a control mode on the pressure decreasing side is selected out of the control modes of the left and right rear wheels. Since the vehicle is running in an unstable running state but is not turning, there is little possibility that the running stability of the vehicle further deteriorates even if the braking forces of the rear wheels are increased.

Further, in another aspect of the present disclosure, the control unit is configured to select a control mode on the pressure decreasing side out of the control modes of the left and right front wheels, to select a control mode on the pressure decreasing side out of the control modes of the left and right rear wheels, to select a control mode on the pressure decreasing side out of the two selected control modes as a prescribed control mode, and to control the upstream braking actuator so that the upstream pressure is controlled in the prescribed control mode when the running state of the vehicle is unstable and the vehicle is turning.

According to the above aspect, when a running state of the vehicle is unstable and the vehicle is turning, a control mode on the pressure decreasing side is selected out of the control modes of the left and right front wheels, a control mode on the pressure decreasing side is selected out of the control modes of the left and right rear wheels, and a control mode on the pressure decreasing side is selected out of the two selected control modes as a prescribed control mode. Therefore, it is possible to reduce a braking forces of the rear wheels and to reduce a possibility of further deteriorating the running stability of the vehicle while turning as compared to where a control mode on the pressure increasing side control mode is selected out of the control modes of the left and right rear wheel.

Further, in another aspect of the present disclosure, the control unit is configured to select a control mode on the pressure increasing side out of the control modes of the left and right front wheels, to select a control mode on the pressure increasing side out of the control modes of the left and right rear wheels, to select a control mode on the pressure decreasing side out of the two selected control modes as a prescribed control mode, and to control the upstream braking actuator so that the upstream pressure is controlled in the prescribed control mode when a running state of the vehicle is stable and the vehicle is turning.

According to the above aspect, when a running state of the vehicle is stable and the vehicle is turning, a control mode on the pressure increasing side is selected out of the control modes of the left and right front wheels, a control mode on the pressure increasing side is selected out of the control modes of the left and right rear wheels, and a control mode on the pressure decreasing side is selected out of the two selected control modes as a prescribed control mode. Therefore, it is possible to increase the braking forces of the rear wheels and to reduce a possibility that a braking request of the driver is not satisfied as compared to where a control mode on the pressure increasing side is selected out of the control modes of the left and right front wheels and a control mode on the pressure decreasing side is selected out of the control modes of the left and right rear wheels. Notably, since the vehicle is turning stably and a control mode on the pressure decreasing side is selected out of the two selected control modes, selection of a control mode on the pressure increasing side out of the control modes of the left and right rear wheels does not deteriorate the stable turning state of the vehicle.

Further, in another aspect of the present disclosure, the control unit is configured to select a control mode on the pressure increasing side out of the control modes of the left and right front wheels, to select a control mode on the pressure increasing side out of the control modes of the left and right rear wheels, to select a control mode on the pressure increasing side out of the two selected control modes as a prescribed control mode, and to control the upstream braking actuator so that the upstream pressure is controlled in the prescribed control mode when a running state of the vehicle is stable, the vehicle is not turning and a vehicle speed is equal to or lower than a reference value.

According to the above aspect, when a running state of the vehicle is stable, the vehicle is not turning and a vehicle speed is equal to or lower than a reference value, a control mode on the pressure increasing side is selected out of the control modes of the left and right front wheels, a control mode on the pressure increasing side is selected out of the control modes of the left and right rear wheels, and a control mode on the pressure increasing side is selected out of the two selected control modes as a prescribed control mode. Therefore, the braking force of the entire vehicle can be increased and a braking request of the driver can be satisfied effectively as compared to where a control mode on the pressure decreasing side is selected out of the two selected control modes as a prescribed control mode. Since the vehicle is traveling stably without turning, even if the braking force of the entire vehicle is high, the stability of the vehicle does not deteriorate.

Further, in another aspect of the present disclosure, the control unit is configured to select a control mode on the pressure increasing side out of the control modes of the left and right front wheels, to select a control mode on the pressure increasing side out of the control modes of the left and right rear wheels, to select a control mode on the pressure decreasing side out of the two selected control modes as a prescribed control mode, and to control the upstream braking actuator so that the upstream pressure is controlled in the prescribed control mode when a running state of the vehicle is stable, the vehicle is not turning and a vehicle speed is higher than a reference value.

According to the above aspect, when a running state of the vehicle is stable, the vehicle is not turning and a vehicle speed is higher than a reference value, a control mode on the pressure increasing side is selected out of the control modes of the left and right front wheels, a control mode on the pressure increasing side is selected out of the left and right rear wheels, and a control mode on the pressure decreasing side out of the two selected control modes is selected as a prescribed control mode. Therefore, as compared to where a control mode on the pressure increasing side out of the two selected control modes is selected as a prescribed control mode, it is possible to reduce a possibility that the braking pressures of the wheels become excessive and braking slips of the wheels become excessive. Further, it is possible to reduce a possibility that the stability of the vehicle deteriorates due to an excessive braking force of the entire vehicle while satisfying a braking request of the driver as much as possible.

Further, in another aspect of the present disclosure, the upstream braking actuator includes a hydraulic pressure supply source, master cut valves, and an upstream pressure control valve in addition to the master cylinder device, and the upstream pressure control valve is configured to supply hydraulic liquid from the hydraulic pressure supply source to the downstream braking actuator, thereby controlling the upstream pressure in the pressure increasing mode when the prescribed control mode is the pressure increasing mode, to control the upstream pressure in the pressure holding mode by shutting off a communication between the hydraulic pressure supply source and the downstream braking actuator when the prescribed control mode is the pressure holding mode, and to control the upstream pressure in the pressure decreasing mode by discharging hydraulic liquid from the downstream braking actuator to the hydraulic pressure supply source when the prescribed control mode is the pressure decreasing mode.

According to the above aspect, the upstream pressure can be controlled in the pressure increasing mode when the prescribed control mode is the pressure increasing mode, the upstream pressure can be controlled in the pressure holding mode when the prescribed control mode is the pressure holding mode, and the upstream pressure can be controlled in the pressure decreasing mode when the prescribed control mode is the pressure decreasing mode.

Other objects, other features and attendant advantages of the present disclosure will be readily understood from the description of the embodiments of the present disclosure described with reference to the following drawings.

DETAILED DESCRIPTION

The present disclosure will now be described in detail with reference to the accompanying drawings.

First Embodiment

Figure 1:
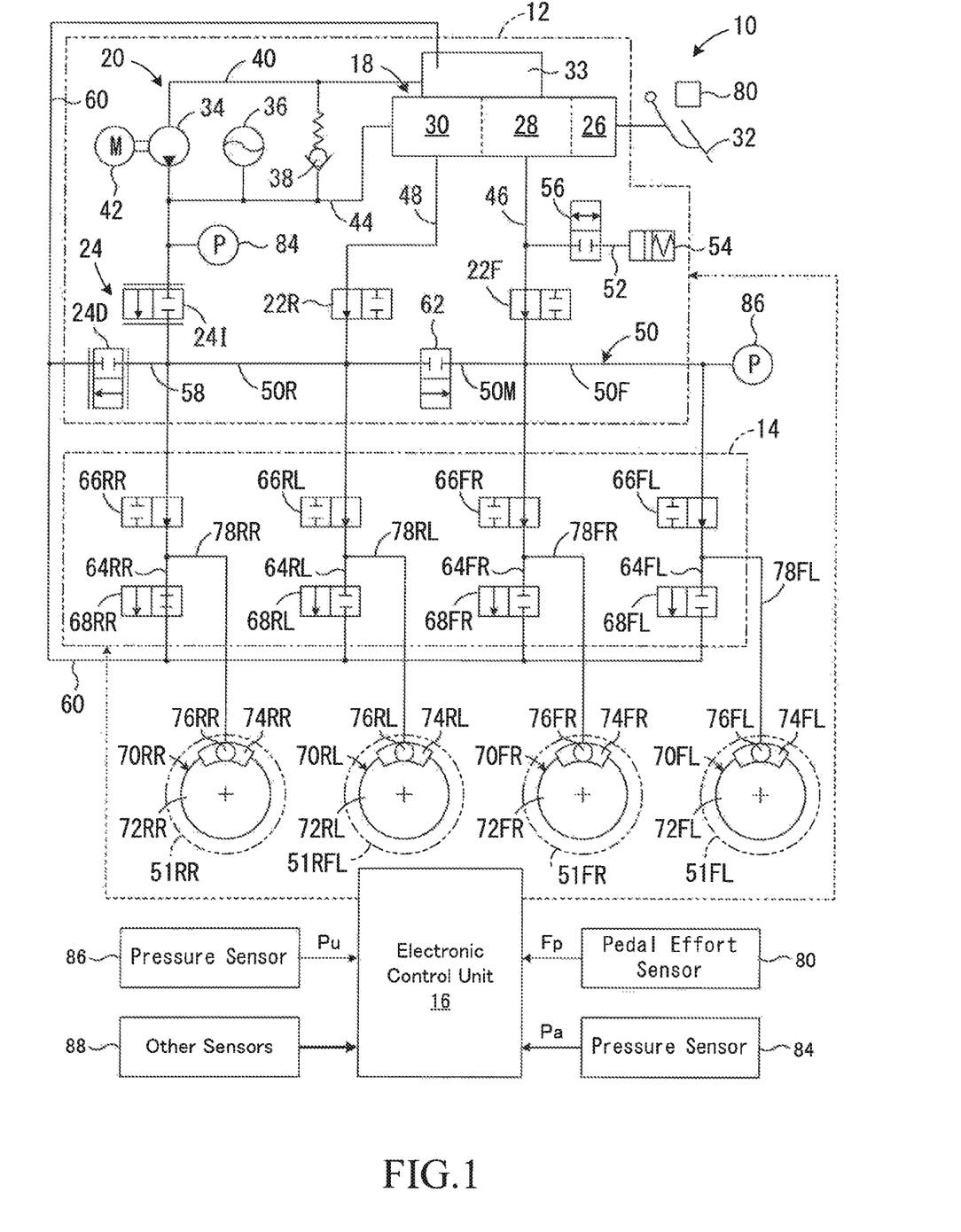
FIG. 1 is a schematic configuration diagram showing a first embodiment of a braking force control apparatus for a vehicle according to the present disclosure.

As shown in FIG. 1, the braking force control apparatus 10 comprises an upstream braking actuator 12, a downstream braking actuator 14, and an electronic control unit (ECU) 16 as a control device for controlling the upstream braking actuator and the downstream braking actuator. The upstream braking actuator 12 includes a master cylinder device 18 driven by braking operation of a driver, a hydraulic pressure supply source 20, master cut valves 22F and 22R, and an upstream pressure control valve 24. In FIG. 1, the illustration of springs and solenoids of each valve is omitted for the purpose of simplification.

The master cylinder device 18 has a booster 26, a master cylinder 28 and a regulator 30. A brake pedal 32 operated by the driver is connected to the booster 26, and a reservoir 33 that stores a brake oil (not shown) as a working fluid is connected to the master cylinder 28 and the regulator 30. As is well known, a pressure of the regulator 30 is controlled to be substantially the same as a pressure of the master cylinder 28. Since the functions of the booster 26, the master cylinder 28 and the regulator 30 are well known by those skilled in the art, descriptions thereof will be omitted.

The hydraulic pressure supply source 20 includes an oil pump 34, an accumulator 36 and a relief valve 38, but the accumulator may be omitted. The oil pump 34 is provided in a supply conduit 40 connected to the reservoir 33 at one end, and is driven by an electric motor 42 to pump the brake oil from the reservoir 33 to discharge a high pressure brake oil. A connection conduit 44 is connected between the supply conduit 40 on the discharge side of the oil pump 34 and the regulator 30, and the accumulator 36 is connected to the connection conduit 44. When a pressure in the connecting conduit 44 exceeds a preset relief pressure, the relief valve 38 returns the brake oil in the connecting conduit 44 to the supply conduit 40 on the side of the reservoir 33 relative to the oil pump 34, thereby to adjust the pressure in the connecting conduit 44 to be equal to or lower than the relief pressure.

The master cylinder 28 and the regulator 30 are connected to a supply conduit 50 common to the left and right front wheels and the left and right rear wheels provided in the upstream braking actuator 12 by a first supply conduit 46 and a second supply conduit 48, respectively. The master cut valves 22F and 22R are normally open type electromagnetic on-off valves provided in the first supply conduit 46 and the second supply conduit 48, respectively. A stroke simulator 54 is connected to the first supply conduit 46 by a connection conduit 52 and a connection control valve 56 which is a normally closed type electromagnetic on-off valve is provided in the connection conduit 52. The connection control valve 56 opens when the master cut valves 22F and 22R are closed, thereby permitting the driver to depress the brake pedal 32, and applying a pedaling reaction force to the driver via the brake pedal 32.

The upstream pressure control valve 24 includes a pressure increasing control valve 24I and a pressure decreasing control valve 24D which are normally closed electromagnetic differential pressure control valves. The other end of the supply conduit 40 is connected to the supply conduit 50 and the pressure increasing control valve 24I is provided in the supply conduit 40 on the discharge side of the oil pump 34. The supply conduit 50 is connected to a discharge conduit 60 connected to the reservoir 33 at one end by a connection conduit 58 and the pressure decreasing control valve 24D is provided in the connection conduit 58. The pressure increasing control valve 24I and the pressure decreasing control valve 24R may each be, for example, a linear solenoid valve configured to open as necessary when the master cut valves 22F and 22R are closed, and to increase an opening amount as an amount of current flowing to a solenoid (not shown) increases. As shown in FIG. 1, the upstream braking actuator 12 set an upstream pressure Pu to a pressure in the master cylinder 28 when the master cut valves 22F and 22R are opened and the pressure increasing control valve 24I, the pressure decreasing control valve 24D and the connection control valve 56 are closed.

When an opening amount of the pressure increasing control valve 24I increases, a flow rate of the oil flowing from the hydraulic pressure supply source 20 via the supply conduit 40 to the supply conduit 50 increases, and a pressure in the supply conduit 50 increases (pressure increasing mode). On the other hand, as an opening amount of the pressure decreasing control valve 24D increases, a flow rate of the oil flowing from the supply conduit 50 via the connecting conduit 58 to the discharge conduit 60 increases and the pressure in the supply conduit 50 decreases (pressure decreasing mode). Furthermore, when the pressure increasing control valve 24I and the pressure decreasing control valve 24D are in the closed state, the pressure in the supply conduit 50 does not change (pressure holding mode). Accordingly, the upstream braking actuator 12 can control, in the modes of the pressure increasing mode, the pressure decreasing mode and the pressure holding mode, an upstream pressure Pu supplied from the upstream braking actuator to the downstream braking actuator in a state in which the communication between the master cylinder device 18 and the downstream braking actuator 14 is cut off.

The supply conduit 50 includes a supply conduit 50F common to the left and right front wheels 51FL and 51FR and a supply conduit 50R common to the left and right rear wheels 51RL and 51RR. An intermediate supply conduit 50M is provided between the supply conduits 50F and 50R and is provided with a communication control valve 62. The communication control valve 62 is a normally closed type electromagnetic on-off valve, which is opened when the master cut valves 22F and 22R are closed, thereby connecting the supply conduit 50F common to the left and right front wheels and the supply conduit 50R common to the left and right rear wheels.

One ends of a left front wheel control conduit 64FL and a right front wheel control conduit 64FR are connected to the supply conduit 50F. The other ends of these control conduits are connected to the discharge conduit 60. The control conduit 64FL is provided with a pressure increasing-holding valve 66FL and a pressure decreasing valve 68FL for the left front wheel, and the control conduit 64FR is provided with a pressure increasing-holding valve 66FR and a pressure decreasing valve 68FR for the right front wheel. Similarly, one ends of a left rear wheel control conduit 64RL and a right rear wheel control conduit 64RR are connected to the supply conduit 50R, and the other ends of these control conduits are connected to the discharge conduit 60. The control conduit 64RL is provided with a pressure increasing-holding valve 66RL and a pressure decreasing valve 68RL for the rear left wheel. The control conduit 64RR is provided with a pressure increasing-holding valve 66RR and a pressure decreasing valve 68RR for the right rear wheel.

Although not shown in detail in FIG. 1, braking force generating devices 70FL and 70FR are provided corresponding to the left and right front wheels 51FL and 51FR, and braking force generating devices 70RL and 70RR are provided corresponding to the left and right rear wheels 51RL and 51RR. The braking force generating devices 70FL to 70RR include, respectively, brake discs 72FL to 72RR rotating together with corresponding wheels and brake calipers 74FL to 74RR pressing brake pads against the corresponding brake discs. The brake calipers 74FL to 74RR include wheel cylinders 76FL to 76RR, respectively, and change pressing forces of the brake pads against the brake disks according to pressures in the wheel cylinders, that is, braking pressures Pwfl to Pwrr, to convert the braking pressures into the braking forces, and generate braking forces corresponding to the braking pressures. The braking force generating devices may be drum-type braking force generating devices.

One end of a supply/discharge conduit 78FL is connected to the control conduit 64FL between the pressure increasing-holding valve 66FL and the pressure decreasing valve 68FL for the front left wheel, and the other end of the supply/discharge conduit 78FL is connected to the wheel cylinder 76FL of the braking force generating device 70FL. One end of a supply/discharge conduit 78FR is connected to the control conduit 64FR between the pressure increasing-holding valve 66FR and the pressure decreasing valve 68FR for the right front wheel, and the other end of the supply/discharge conduit 78FR is connected to the wheel cylinder 76FR of the braking force generating device 70FR. One end of a supply/discharge conduit 78RL is connected to the control conduit 64RL between the pressure increasing-holding valve 66RL and the pressure decreasing valve 68RL for the left rear wheel, and the other end of the supply/discharge conduit 78RL is connected to the wheel cylinder 76RL of the braking force generating device 70RL. One end of a supply/discharge conduit 78RR is connected to the control conduit 64RR between the pressure increasing-holding valve 66RR and the pressure decreasing valve 68RR for the right rear wheel, and the other end of the supply/discharge conduit 78RR is connected to the wheel cylinder 76RR of the braking force generating device 70RR.

The downstream braking actuator 14 controls braking pressures Pwfl to Pwrr of the corresponding wheels in the pressure increasing mode by opening the pressure increasing-holding valves 66FL to 66RR and closing the pressure decreasing valve 68FL to 68RR as shown in FIG. 1. The downstream braking actuator 14 controls braking pressures Pwfl to Pwrr of the corresponding wheels in the pressure decreasing mode by closing the pressure increasing-holding valves 66FL to 66RR and opening the pressure decreasing valve 68FL to 68RR. Further, the downstream braking actuator 14 controls braking pressures Pwfl to Pwrr of the corresponding wheels in the pressure holding mode by closing the pressure increasing-holding valves 66FL to 66RR and closing the pressure decreasing valve 68FL to 68RR, that is, by shutting off communication between the hydraulic pressure supply source 20 and the downstream braking actuator 14.

In the embodiment, the pressure increasing-holding valves 66FL to 66RR are normally open type electromagnetic on-off valves and the pressure decreasing valves 68FL to 68RR are normally closed type electromagnetic on-off valves. However, the pressure increasing-holding valve and the pressure decreasing valve of each wheel may be replaced by one solenoid valve of three-port three-position switching type capable of increasing, holding and decreasing the braking pressure. In addition, the pressure increasing-holding valves 66FL to 66RR may each be a linear solenoid valve configured such that an opening amount decreases as an amount of current flowing to the solenoid increases.

The brake pedal 32 is provided with a pedal effort sensor 80 for detecting a pedal effort Fp applied to the brake pedal by the driver. A signal indicating the pedal effort Fp detected by the pedal effort sensor 80 is input to the electronic control unit 16. The pedal effort Fp is a value indicating a braking operation amount of the driver, but a master cylinder pressure Pm which is a pressure in the master cylinder 28 or a pressure in the first supply conduit 46 between the master cylinder and the master cut valve 22F may be detected as a braking operation amount of the driver.

The supply conduit 40 between the oil pump 34 and the pressure increasing control valve 241 is connected with a pressure sensor 84 for detecting a pressure in the supply conduit (accumulator pressure Pa). A pressure sensor 86 that detects a pressure (upstream pressure Pu) in the supply conduit 50F is connected to the supply conduit. Signals indicating the accumulator pressure Pa and the upstream pressure Pu detected by the pressure sensors 84 and 86, respectively, are also input to the electronic control unit 16. Further, signals indicating various parameters relating to a running condition of the vehicle, such as a steering angle 8 and a vehicle speed V, are also input from the other sensors 88 to the electronic control unit 16.

The electronic control unit 16 may be a microcomputer having, for example, a CPU, a ROM, a RAM and an input/output port unit, which are connected to each other by a bi-directional common bus. The ROM stores a control program of the upstream braking actuator 12 corresponding to the flowchart shown in FIG. 2 and a control program of the downstream braking actuator 14 corresponding to the flowchart shown in FIG. 3. The CPU controls the upstream braking actuator 12 according to the control program of the upstream braking actuator and controls the downstream braking actuator 14 according to the control program of the downstream braking actuator, as will be described in detail later.

In particular, in the first embodiment, control of the braking forces by the antiskid control (ABS control), that is, control of the braking forces by the control modes of the pressure decreasing mode, the pressure holding mode, the pressure increasing mode and the non-control mode is performed by the control program of the downstream braking actuator 14. Further, when it is impossible to reduce a braking pressure as in a case where the pressure decreasing valve of any one of the wheels remains closed and cannot be opened, it is determined that the downstream braking actuator 14 is in the specific abnormality. In a braking force control apparatus in which a braking pressure is decreased by suction of an oil pump, even when the oil pump or an electric motor for driving the oil pump malfunctions, it is determined that the downstream braking actuator 14 is in the specific abnormality.

When the downstream braking actuator 14 is in the specific abnormality, the control program of the upstream braking actuator 12 controls the upstream pressure Pu in a manner for the situation where the downstream braking actuator 14 is in the specific abnormality. That is, a prescribed control mode is determined according to the following equation (1), and the upstream pressure Pu is controlled in the prescribed control mode. In the following equation (1), IN means selecting a control mode on the pressure increasing side out of the control modes of the two wheels in parenthesis, and DE means selecting a control mode on the pressure decreasing side out of the control modes of the two wheels in parenthesis.

Prescribed control mode=$DE(IN$(left front wheel, right front wheel),$IN$(left rear wheel,right rear wheel)) (1)

In selecting a control mode on the pressure increasing side, the priority of selection is set higher in the order of the pressure increasing mode, the pressure holding mode, the pressure decreasing mode and the non-control mode, and in the selection of the control mode on the pressure decreasing side, the priority of selection is set higher in the order of the pressure decreasing mode, the pressure holding mode, the pressure increasing mode and the non-controlling mode. When the two control modes to be selected are the same, the control mode is selected. The meanings of the aforementioned IN and DE and the priority of selection are the same in the second embodiment to be described later.

<Control of Upstream Braking Actuator 12>

Figure 2:
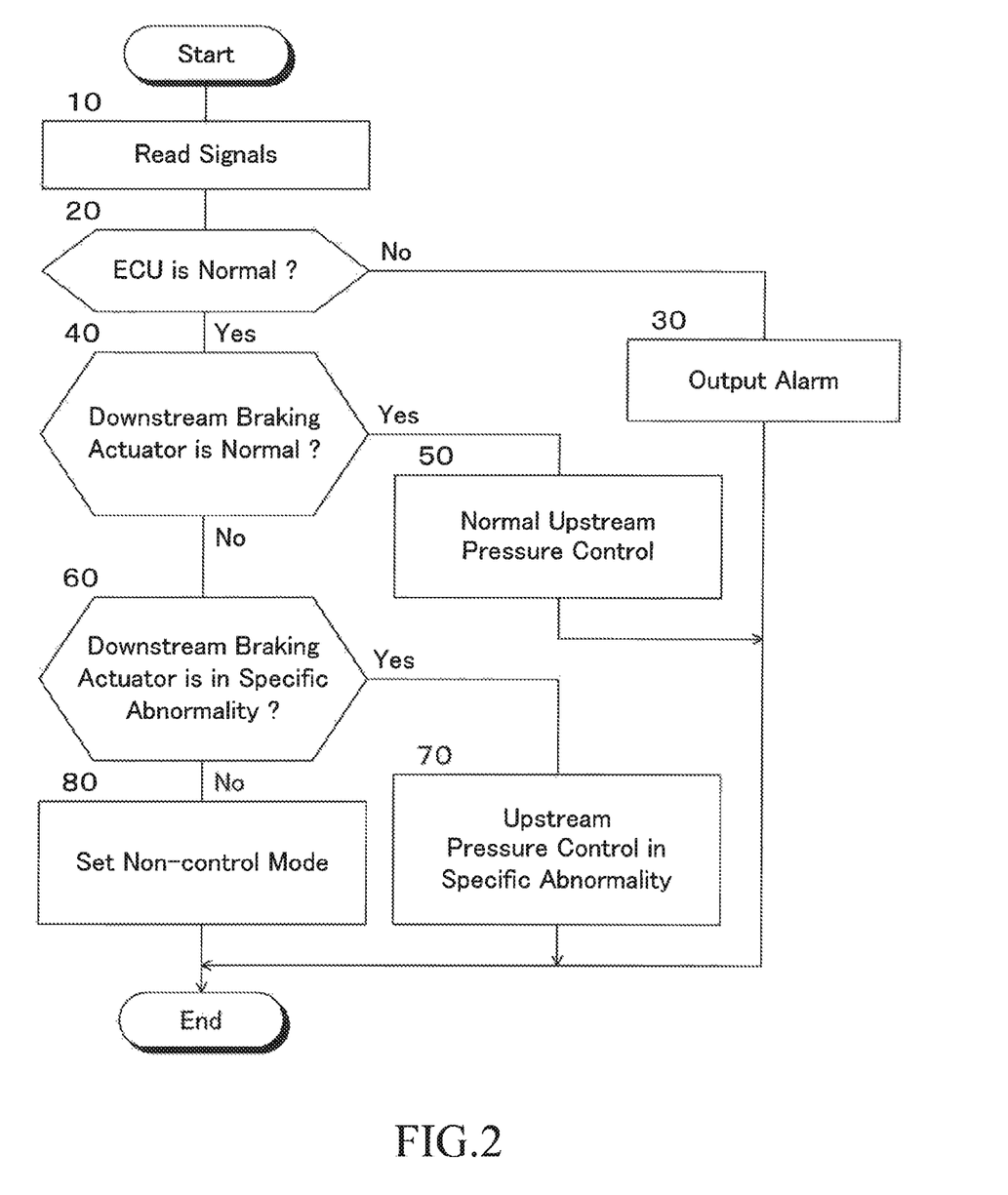
FIG. 2 is a flowchart showing a control routine of an upstream braking actuator in the first embodiment.

Next, the control routine of the upstream braking actuator 12 in the first embodiment will be described with reference to the flowchart shown in FIG. 2. The control according to the flowchart shown in FIG. 2 is repeatedly executed at predetermined time intervals when an ignition switch (not shown) is ON. In the following description, the control of the upstream braking actuator according to the flowchart shown in FIG. 2 is simply referred to as "upstream control". This also applies to the control of the upstream braking actuator according to the flowchart shown in FIG. 4 to be described later.

First, in step 10, a signal indicating a pedal effort Fp detected by the pedal effort sensor 80 and the like are read. In step 20, it is determined whether or not the electronic control unit 16 is normal. When an affirmative determination is made, the upstream control proceeds to step 40, and when a negative determination is made, the upstream control proceeds to step 30.

In step 30, an alarm indicating that the electronic control unit 16 is abnormal is output by actuating an alarm device not shown in FIG. 1.

In step 40, it is determined whether or not the downstream braking actuator 14 is determined to be normal in step 220 of the control routine of the downstream braking actuator 14, which will be described later. When a negative determination is made, the upstream control proceeds to step 60, and when an affirmative determination is made, the upstream control proceeds to step 50. For example, when the pressure increasing-holding valve of any one of the wheels remains closed and cannot be opened or the pressure decreasing valve of one of the wheels remains opened and cannot be closed, it is determined that the downstream braking actuator 14 is not normal (in abnormality other than in the specific abnormality).

In step 50, a normal control of the upstream pressure Pu is performed. That is, the master cut valves 22F and 22R are closed, the connection control valve 56 and the communication control valve 62 are opened, and the oil pump 34 is driven so that the accumulator pressure Pa becomes a pressure within a preset range. Further, a target upstream pressure Put is calculated based on the pedal effort Fp detected by the pedal effort sensor 80 or a target deceleration of the vehicle by a travel control such as an inter-vehicle distance control, and the pressure increasing control valve 241 and the pressure decreasing control valve 24R are controlled so that the upstream pressure Pu becomes the target upstream pressure Put.

In step 60, it is determined whether or not the downstream braking actuator 14 is determined to be in a specific abnormality in step 230 of the control routine of the downstream braking actuator 14 described later. When a negative determination is made, the upstream control proceeds to step 80, and when an affirmative determination is made, the upstream control proceeds to step 70.

In step 70, a control of the upstream pressure Pu when the downstream braking actuator 14 is in a specific abnormality is performed in accordance with the pressure increasing mode, the pressure holding mode, the pressure decreasing mode or the non-control mode set in the control of the downstream braking actuator 14, which will be described later. That is, according to the above equation (1), a control mode on the pressure increasing side is selected out of the control modes of the left and right front wheels, a control mode on the pressure increasing side is selected out of the control modes of the left and right rear wheels and a control mode on the pressure decreasing side out of the two selected control modes is selected as a prescribed control mode. Further, the upstream pressure Pu is controlled in the prescribed control mode. Notably, by operating an alarm device not shown in FIG. 1, an alarm indicating that the downstream braking actuator 14 is in a specific abnormality may be outputted.

In step 80, no control currents are supplied to the valves and the electric motor 42, so that the upstream braking actuator 12 is controlled in the non-control mode. That is, the master cut valves 22F and 22R are opened, and the connection control valve 56, the communication control valve 62, the pressure increasing control valve 241 and the pressure decreasing control valve 24R are maintained in the closed state. Further, the pump 34 is stopped. Notably, an alarm indicating that the downstream braking actuator 14 is abnormal other than in the specific abnormality may be output by actuating an alarm device not shown in FIG. 1.

<Control of Downstream Braking Actuator 14>

Figure 3:
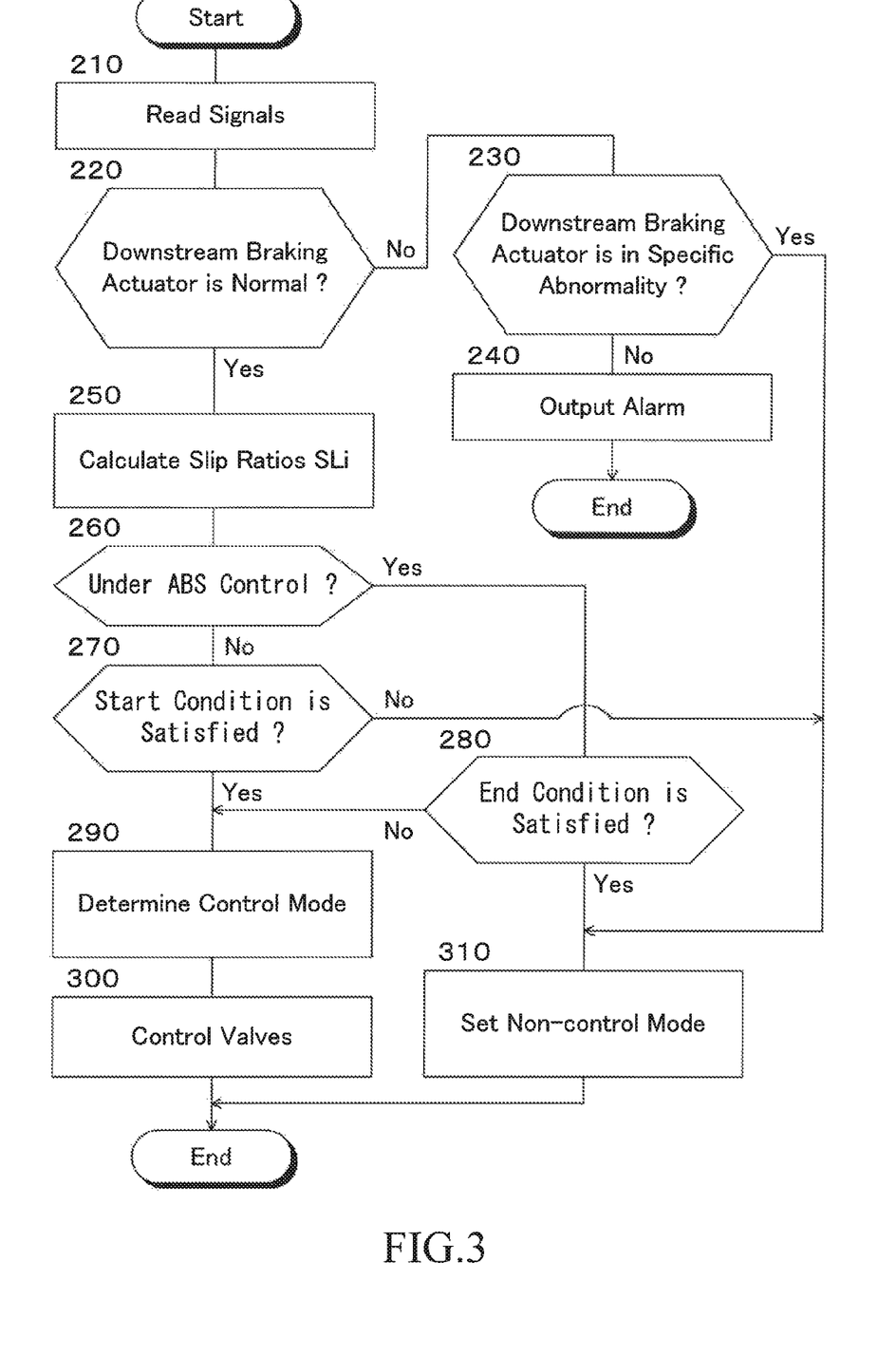
FIG. 3 is a flowchart showing a control routine of a downstream braking actuator in the first embodiment.

Next, the control routine of the downstream braking actuator 14 in the first embodiment will be described with reference to the flowchart shown in FIG. 3. The control according to the flowchart shown in FIG. 3 is repeatedly executed in the order of the left front wheel 51FL, the right front wheel 51FR, the left rear wheel 51RL and the right rear wheel 51RR, for example, when the ignition switch (not shown) is ON. In the following description, the control of the downstream braking actuator according to the flowchart shown in FIG. 3 is simply referred to as "downstream control".

In step 210, signals indicating the wheel speeds Vwfl, Vwfr, Vwrl and Vwrr of the left front wheel 51FL, the right front wheel 51FR, the left rear wheel 51RL, and the right rear wheel 51RR detected by the wheel speed sensors among the other sensors 88 are read.

In step 220, it is determined whether or not the downstream braking actuator 14 is normal, that is, whether or not it is possible to normally open and close the pressure increasing-holding valves 66FL to 66RR and the pressure decreasing valves 68FL to 68RR of all the wheels. When an affirmative determination is made, the downstream control proceeds to step 250, and when a negative determination is made, the downstream control proceeds to step 230.

In step 230, it is determined whether or not the downstream braking actuator 14 is in the specific abnormality. When an affirmative determination is made, the downstream control proceeds to step 310, and when a negative determination is made, that is, when the downstream braking actuator 14 is determined to be abnormal but not in the specific abnormality, the downstream control proceeds to step 240.

In step 240, an alarm indicating that the downstream braking actuator 14 is abnormal but not in the specific abnormality is output by activating an alarm device not shown in FIG. 1, and thereafter, the downstream control ends once. Since the pressure increasing-holding valves 66FL to 66RR and the pressure decreasing valves 68FL to 66RR are not controlled, in principle, the pressure increasing-holding valves 66FL to 66RR of all the wheels are set to the open positions and the pressure decreasing valves 68FL to 68RR are set to the closed positions.

In step 250, an estimated vehicle speed Vb is calculated based on the wheel speeds Vwi (i=fl, fr, rl and rr) in a manner known in the art. Further, braking slip rates SLi (i=fl, fr, rl and rr) of the wheels are calculated based on the estimated vehicle speed Vb and the wheel speeds Vwi.

In step 260, a determination is made as to whether or not braking force control by the anti-skid control is being performed for the relevant wheel. When an affirmative determination is made, the downstream control proceeds to step 280, and when a negative determination is made, the downstream control proceeds to step 270.

In step 270, a determination is made as to whether or not the condition for starting the control of the braking force by the anti-skid control is satisfied for the relevant wheel. For example, it is determined whether the estimated vehicle speed Vb is equal to or greater than a control start reference value Vbs (a positive constant) and the braking slip rate SLi of the wheel is equal to or greater than a reference value SLo (a positive constant). When a negative determination is made, the downstream control proceeds to step 310, and when an affirmative determination is made, the downstream control proceeds to step 290.

In step 280, it is determined whether or not the condition for ending the control of the braking force by the anti-skid control is satisfied for the relevant wheel. For example, when a vehicle speed V is equal to or lower than an ending reference value or a master cylinder pressure Pm is equal to or lower than an ending pressure reference value, it may be determined that the ending condition is satisfied. When an affirmative determination is made, the downstream control proceeds to step 310, and when a negative determination is made, the downstream control proceeds to step 290.

In step 290, based on the braking slip rate SLi of the wheel, a determination is made in a manner known in the art as to whether the control mode for bringing the braking slip ratio to a value within the predetermined range is the pressure increasing mode, the pressure holding mode or the pressure decreasing mode.

In step 300, a target duty ratio Dti (i=fl, fr, rl or rr) of the pressure increasing-holding valve or the pressure decreasing valve of the wheel is calculated based on a deceleration Gxb of the vehicle calculated based on a longitudinal acceleration Gx of the vehicle, the control mode and the braking slip rate SLi of the relevant wheel. Further, the duty ratio of the pressure increasing-holding valve 66FL, 66FR, 66RL or 66RR or the pressure decreasing valve 68FL, 68FR, 68RL or 68RR of the relevant wheel is controlled according to the control mode and the target duty ratio Dti, so that the braking pressure of the wheel is controlled to an appropriate value. Note that braking force control by the anti-skid control may be performed in any manner known in the art.

In step 310, the downstream braking actuator 14 is controlled in the uncontrolled mode. That is, the pressure increasing-holding valve 66FL, 66FR, 66RL or 66RR of the relevant wheel is controlled to the open position, and the pressure decreasing valve 68FL, 68FR, 68RL or 68RR is controlled to the closed position.

As understood from the above description, when the downstream braking actuator 14 is normal, the control mode of the braking force by the anti-skid control is determined to one of the pressure increasing mode, the holding mode, the pressure decreasing mode, and the non-reducing mode depending on a state of the braking slip of each wheel. Further, the pressure increasing-holding valves 66FL to 66RR and the pressure decreasing valves 68FL to 68RR are controlled in the determined control mode. On the other hand, when the downstream brake actuator 14 is in the specific abnormality, the pressure increasing-holding valves 66FL to 66RR and the pressure decreasing valves 68FL to 68RR are controlled in the non-control mode.

Therefore, when the start condition of the anti-skid control is satisfied for any one of the wheels, the braking pressure of the relevant wheel is controlled in the control modes of the pressure increasing mode, the pressure holding mode, and the pressure decreasing mode so that the degree of braking slip of the wheel is within a predetermined range until the ending condition of the anti-skid control is satisfied. Further, the downstream braking actuator is controlled in the non-control mode so that braking pressures of the wheels other than the relevant wheel become values corresponding to a braking operation amount of the driver.

Operation of First Embodiment

Next, the operation of the braking force control apparatus 10 according to the first embodiment will be described with respect to various cases.

<When the Downstream Brake Actuator 14 is Normal>

In step 40, an affirmative determination is made, and in step 50, the accumulator pressure Pa is controlled to a pressure within a preset range, and the pressure increasing control valve 241 and the pressure decreasing control valve 24D are controlled so that the upstream pressure Pu becomes the target upstream pressure Put.

<When Downstream Brake Actuator 14 is in Specific Abnormality>

In steps 40 and 60, a negative determination and an affirmative determination are made, respectively. In step 70, a prescribed control mode is determined according to the above equation (1), and the upstream pressure Pu is controlled in the prescribed control mode. Therefore, the prescribed control mode is determined by selecting a control mode on the pressure increasing side out of the control modes of the left and right front wheels and a control mode on the pressure increasing side out of the control modes of the left and right rear wheels, and selecting a control mode on the pressure decreasing side out of the two selected control modes.

Therefore, as compared to where the upstream braking actuator 12 is set to the non-control mode and the upstream pressure Pu is not controlled when the downstream braking actuator 14 is in the specific abnormality, it is possible to reduce a possibility that braking slips of the wheels become excessive in a situation where a driver's braking operation amount is excessive. Further, for example, as compared to where control modes on the pressure decreasing side are selected out of the control modes of the left and right front wheels and the left and right rear wheels, and a control mode on the pressure decreasing side is selected out of the two selected control modes, the braking force of the entire vehicle can be increased. Conversely, as compared to where control modes on the pressure increasing side are selected out of the control modes of the left and right front wheels and the left and right rear wheels, and a control mode on the pressure increasing side is selected out of the two selected control modes, the braking force of the entire vehicle can be decreased. Therefore, it is possible to reduce a possibility that the stability of the vehicle deteriorates due to an excessive braking force of the entire vehicle while satisfying a braking request of the driver as much as possible.

<When the Downstream Braking Actuator 14 is in the Other Abnormality>

Negative determinations are made in steps 40 and 60, and in step 80, the upstream brake actuator 12 is controlled in the non-control mode. Therefore, it is possible to connect the master cylinder device 18 and the wheel cylinders 76FL to 76RR as much as possible, and to ensure a situation where the braking force of each wheel changes in accordance with a braking operation amount of the driver.

Second Embodiment

Figure 4:
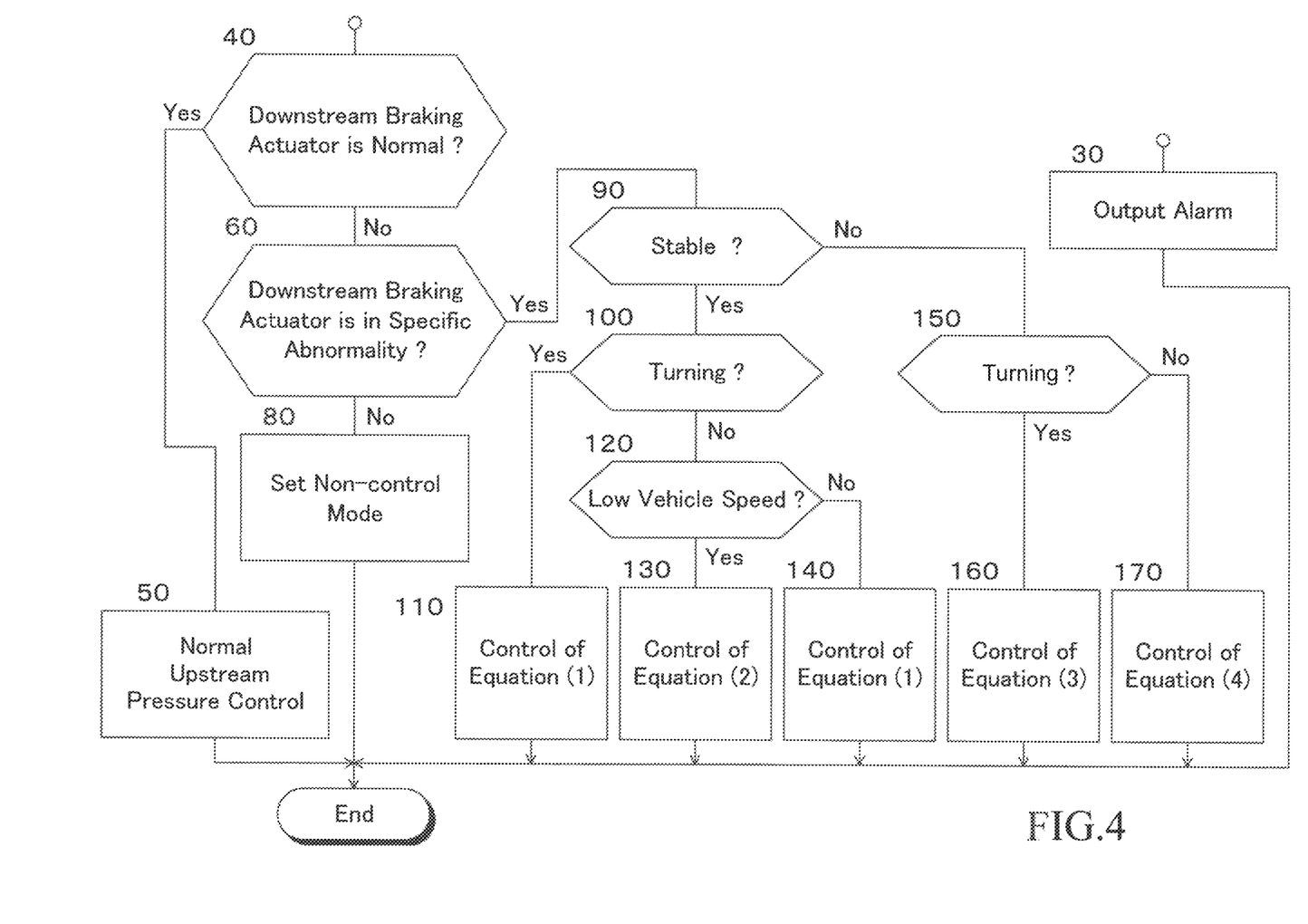
FIG. 4 is a flowchart showing a control routine of an upstream braking actuator in a second embodiment omitting a part of the control routine.

FIG. 4 is a flowchart showing the control routine of the upstream braking actuator 12 in the second embodiment of the braking force control apparatus according to the present disclosure, omitting a part of the control routine. In FIG. 4, the same step numbers as those shown in FIG. 2 are assigned to the same steps as those shown in FIG. 2. Notably, the downstream braking actuator 14 is controlled according to the flowchart shown in FIG. 3 as in the first embodiment. Therefore, illustration and explanation of the flowchart of the control of the downstream braking actuator are omitted.

In the second embodiment, steps 10 to 60 and step 80 are executed in the same manner as in the first embodiment. When an affirmative determination is made in step 60, that is, when it is determined that the downstream brake actuator 14 is in the specific abnormality, the upstream control proceeds to step 90 instead of step 70.

In step 90, based on a deviation between a reference yaw rate of the vehicle and an actual yaw rate, for example, it is determined whether or not the vehicle is in a stable running state in a manner known in the art. When a negative determination is made, the upstream control proceeds to step 150, and when an affirmative determination is made, the upstream control proceeds to step 100.

In step 100, it is determined whether or not the vehicle is turning based on, for example, a magnitude of an actual yaw rate of the vehicle. When a negative determination is made, the upstream control proceeds to step 120, and when an affirmative determination is made, the upstream control proceeds to step 110.

In step 110, according to the above-mentioned equation (1), a control mode on the pressure increasing side out of the control modes of the left and right front wheels and a control mode on the pressure increasing side out of the control modes of the left and right rear wheels are selected, and a control mode on the pressure decreasing side out of the two selected control modes is selected as a prescribed control mode. Furthermore, the upstream pressure Pu is controlled in the prescribed control mode.

In step 120, it is determined whether or not a vehicle speed is low, for example, by determining whether or not a vehicle speed V is equal to or less than a reference value V0 (a positive constant). When a negative determination is made, the upstream control proceeds to step 140, and when an affirmative determination is made, the upstream control proceeds to step 130.

In step 130, according to the following equation (2), a control mode on the pressure increasing side out of the control modes of the left and right front wheels and a control mode on the pressure increasing side out of the control modes of the left and right rear wheels are selected, and a control mode on the pressure increasing side out of the two selected control modes is determined as the prescribed control mode. Furthermore, the upstream pressure Pu is controlled in the prescribed control mode.

The prescribed control mode=$IN(IN$(left front wheel, right front wheel),$IN$(left rear wheel,right rear wheel)) (2)

In step 140, as in step 110, a prescribed control mode is determined according to the above-mentioned equation (1). That is, a control mode on the pressure increasing side out of the control modes of the left and right front wheels and a control mode on the pressure increasing side out of the control modes of the left and right rear wheels are selected, and a control mode on the pressure decreasing side out of the two selected control modes is selected as the prescribed control mode. Furthermore, the upstream pressure Pu is controlled in the prescribed control mode.

In step 150, similarly to step 100, it is determined whether or not the vehicle is turning based on, for example, a magnitude of an actual yaw rate. When a negative determination is made, the upstream control proceeds to step 170, and when an affirmative determination is made, the upstream control proceeds to step 160.

In step 160, according to the following equation (3), a control mode on the pressure decreasing side out of the control modes of the left and right front wheels and a control mode on the pressure decreasing side out of the control modes of the left and right rear wheels are selected, and a control mode on the pressure decreasing side out of the two selected control modes is selected as the prescribed control mode. Furthermore, the upstream pressure Pu is controlled in the prescribed control mode.

Predetermined control mode=$DE(DE$(left front wheel,right front wheel),$DE$(left rear wheel,right rear wheel)) (3)

In step 170, according to the following equation (4), a control mode on the pressure decreasing side out of the control modes of the left and right front wheels and a control mode on the pressure increasing side out of the control modes of the left and right rear wheels are selected, and a control mode on the pressure decreasing side out of the two selected control modes is selected as the prescribed control mode. Furthermore, the upstream pressure Pu is controlled in the prescribed control mode.

Predetermined control mode=$DE(DE$(left front wheel,right front wheel),$IN$(left rear wheel,right rear wheel)) (4)

Operation of Second Embodiment

Next, the operation of the braking force control apparatus 10 according to the second embodiment will be described with respect to various cases which are in a situation where the downstream braking actuator 14 is in the specific abnormality. The operation in a situation where the downstream braking actuator 14 is normal and in a situation where the downstream braking actuator 14 is in the other abnormality are the same as those of the first embodiment.

<When the Vehicle Runs Stably without Turning and it is Not at Low Speed>

A positive determination is made in step 90 and negative determinations are made in steps 100 and 120. Accordingly, in step 140, a prescribed control mode is determined according to the above-mentioned equation (1), and the upstream pressure Pu is controlled in the prescribed control mode.

The prescribed control mode is determined by selecting a control mode on the pressure increasing side out of the control modes of the left and right front wheels and a control mode on the pressure increasing side out of the control modes of the left and right rear wheels, and selecting a control mode on the pressure decreasing side out of the two selected control modes. Therefore, similar to <When Downstream Brake Actuator 14 is in Specific Abnormality> in the first embodiment, as compared to where the upstream pressure Pu is not controlled, it is possible to reduce a possibility that the braking slips of the wheels become excessive in a situation where a driver's braking operation amount is excessive. Further, it is possible to reduce a possibility that the stability of the vehicle deteriorates due to an excessive braking force of the entire vehicle while satisfying a braking request of the driver as much as possible.

<When the Vehicle Runs Stably without Turning and is at Low Speed>

An affirmative determination is made in step 90, a negative determination is made in step 100, and an affirmative determination is made in step 120. Accordingly, in step 130, a prescribed control mode is determined according to the above equation (2), and the upstream pressure Pu is controlled in the prescribed control mode.

The prescribed control mode is determined by selecting a control mode on the pressure increasing side out of the control modes of the left and right front wheels and a control mode on the pressure increasing side control mode out of the control modes of the left and right rear wheel, and selecting a control mode on the pressure increasing side out of the two selected control modes. Therefore, the braking force of the entire vehicle can be increased and a braking request of the driver can effectively be satisfied as compared to where the prescribed control mode is determined according to, for example, the above-mentioned equation (1). Since the vehicle is traveling stably without turning, even if the braking force of the entire vehicle is high, the stability of the vehicle does not deteriorate.

<When the Vehicle is Turning in a Stable Running State>

Affirmative determinations are made in steps 90 and 100. Accordingly, in step 110, a prescribed control mode is determined according to the above-mentioned equation (1), and the upstream pressure Pu is controlled in the prescribed control mode.

The prescribed control mode is determined by selecting a control mode on the pressure increasing side out of the control modes of the left and right front wheels and a control mode on the pressure increasing side out of the control modes of the left and right rear wheels, and selecting a control mode on the pressure decreasing side out of the two selected control modes. Therefore, it is possible to increase the braking forces of the rear wheels and to reduce a possibility that a braking request of the driver is not satisfied as compared to where a control mode on the pressure increasing side is selected out of the control modes of the left and right front wheels and a control mode on the pressure decreasing side is selected out of the control modes of the left and right rear wheels. Notably, since the vehicle is turning stably and a control mode on the pressure decreasing side is selected out of the two selected control modes, selection of a control mode on the pressure increasing side out of the control modes of the left and right rear wheels does not deteriorate the stable turning state of the vehicle.

<When the Vehicle is Turning in an Unstable Running State>

A negative determination is made in step 90 and an affirmative determination is made in step 150. Therefore, in step 160, a prescribed control mode is determined according to the above-mentioned equation (3), and the upstream pressure Pu is controlled in the prescribed control mode.

The prescribed control mode is determined by selecting a control mode on the pressure decreasing side out of the control modes of the left and right front wheels and a control mode on the pressure decreasing side out of the control modes of the left and right rear wheels, and selecting a control mode on the pressure decreasing side out of the two selected control modes. Therefore, it is possible to reduce the braking forces of the rear wheels and to reduce a possibility of further deteriorating the running stability when the vehicle is turning as compared to where the prescribed control mode is determined in accordance with, for example, the above-mentioned equation (4).

<When the Vehicle is Running in an Unstable Traveling State and is Not Turning>

Negative determinations are made in steps 90 and 150. Therefore, in step 170, a prescribed control mode is determined according to the above-mentioned equation (4), and the upstream pressure Pu is controlled in the prescribed control mode.

The prescribed control mode is determined by selecting a control mode on the pressure decreasing side out of the control modes of the left and right front wheels and a control mode on the pressure increasing side out of the control modes of the left and right rear wheels, and selecting a control mode on the pressure decreasing side out of the two selected control modes. Therefore, it is possible to increase the braking forces of the rear wheels and to effectively satisfy a braking request of the driver as compared to where the prescribed control mode is determined in accordance with, for example, the above-mentioned equation (3). Since the vehicle is traveling in an unstable traveling state but is not turning, there is little possibility that the running stability of the vehicle further deteriorates even if the braking forces of the rear wheels are increased.

As can be understood from the above description, according to the second embodiment, in addition to obtaining the same operational effect as the first embodiment when the vehicle travels stably without turning and is not at low speed and when the vehicle turns stably, it is possible to optimally control the upstream pressure Pu in accordance with a running condition of the vehicle.

Although the present disclosure has been described in detail with reference to specific embodiments, it will be apparent to those skilled in the art that the present disclosure is not limited to the above-described embodiments, and various other embodiments are possible within the scope of the present disclosure.

For example, in the above-described first and second embodiments, the upstream braking actuator 12 and the downstream braking actuator 14 are controlled by the electronic control unit 16. However, the upstream braking actuator 12 and the downstream braking actuator 14 may each be controlled by a respective electronic control unit. In that case, the controls of the upstream pressure according to the flowcharts shown in FIGS. 2 and 4 are performed by an electronic control unit for the upstream braking actuator 12, and the control of the braking pressure according to the flowchart shown in FIG. 3 is performed by an electronic control unit for the downstream braking actuator 14.

Further, in the above-described second embodiments, determinations of steps 90, 100, 120 and 150 are performed, and steps 110, 130, 140, 160 and 170 are executed according to the determination results. However, one of the determinations of steps 90, 100, 120 and 150 may be skipped and the corresponding steps 90, 100, 120 or 150 may be omitted. For example, step 120 may be omitted and the upstream pressure control may proceed to step 140 when a negative determination is made in step 100.

Further, in the above-described first and second embodiments, the upstream pressure control valve 24 includes a pressure increasing control valve 241 and a pressure decreasing control valve 24D. However, the pressure increasing control valve 241 and the pressure decreasing control valve 24D may be replaced by a valve device of three-port three-position switching type which controls the communication and the degree of communication between the supply conduit 50R and both the supply conduit 40 and the discharge conduit 60.

Further, in the above-described first and second embodiments, the upstream braking actuator 12 includes a master cylinder device 18, a hydraulic pressure supply source 20, master cut valves 22F and 22R, and an upstream pressure control valve 24. However, as described in, for example, Japanese Patent Application Laid-Open Publication No. 2017-52305, the upstream brake actuator 12 may be an upstream braking actuator of back pressure control type which can control the upstream pressure Pu by controlling the back pressure of the master cylinder 28 and the regulator 30.

Further, in the above-described first and second embodiments, pressure reduction of the braking pressures is performed by opening the pressure decreasing valves 68FL to 68RR and returning the oil to the reservoir 33. However, the pressure decreasing valves may be opened and the oil may be sucked by the oil pump.

Further, in the above-described first and second embodiments, the upstream brake actuator 12 and the downstream braking actuator 14 have the front wheel system and the rear wheel system, these actuators may have a front left and rear right system and a front right and rear left system.

Further, in the above-described second embodiment, in step 110, a control mode on the pressure increasing side out of the control modes of the left and right front wheels and a control mode on the pressure increasing side out of the control modes of the left and right rear wheels are selected. However, a control mode on the pressure increasing side out of the control modes of the left and right front wheels and a control mode on the pressure decreasing side out of the control modes of the left and right rear wheels may be selected.

What is claimed is:

1. A braking force control apparatus for a vehicle comprising:
   an upstream braking actuator that includes a master cylinder device that is driven by braking operation of a driver and generates a common upstream pressure for left and right front wheels and left and right rear wheels,
   a downstream braking actuator that individually controls braking pressures supplied to braking force generating devices of the left and right front wheels and the left and right rear wheels, and
   an electronic control unit (ECU) for controlling the upstream braking actuator and the downstream braking actuator, the ECU being configured to:
   when an anti-skid control start condition is satisfied for any of the wheels:
      control the downstream braking actuator in a pressure increasing mode, a pressure holding mode, or a pressure decreasing mode so that a degree of braking slip of a relevant wheel falls within a predetermined range until an anti-skid control ending condition is satisfied, the relevant wheel being a wheel for which the anti-skid control start condition is satisfied, and
      control the downstream braking actuator in a non-controlling mode so that braking pressures of wheels other than the relevant wheel become values corresponding to a braking operation amount of the driver,
   control the upstream braking actuator to control the common upstream pressure in the pressure increasing mode, the pressure holding mode, the pressure decreasing mode, or the non-controlling mode, and set the common upstream pressure to a pressure in the master cylinder device in the non-controlling mode, and
   when a specific abnormality in which the common upstream pressure is able to be supplied from the upstream braking actuator to the braking force generating devices of each wheel but a braking pressure in the braking force generating devices of any one of the wheels is not able to be decreased due to a case in which a pressure decreasing valve of the any one of the wheels in the downstream braking actuator is not able to discharge brake oil into a reservoir, the ECU is further configured to:
      select a control mode on a pressure increasing side, a pressure increasing side priority of selection being set in a listed order of decreasing priority: the pressure increasing mode, the pressure holding mode, the pressure decreasing mode, and the non-controlling mode,
      select a control mode on a pressure decreasing side, a pressure decreasing side priority of selection being set in a listed order of decreasing priority: the pressure decreasing mode, the pressure holding mode, the pressure increasing mode, and the non-controlling mode, and
      based upon the selected control mode on the pressure increasing side and the selected control mode on the pressure decreasing side, and when a running state of the vehicle is stable and the vehicle is turning, the ECU is configured to select a prescribed control mode (PCM) using the following equation (1):
      PCM=DE(IN(left front wheel, right front wheel), IN(left rear wheel, right rear wheel)),
   where in evaluating the PCM equation, the ECU determines the control mode for each wheel that would reduce a possibility that stability of the vehicle deteriorates, IN means selecting the control mode on the pressure increasing side by selecting the control mode out of the control mode for the two wheels in parenthesis according to the pressure increasing side priority of selection, and DE means selecting the control mode on the pressure decreasing side out of the control mode for the two wheels in parenthesis according to the pressure decreasing side priority of selection, and
   control the upstream braking actuator so that the common upstream pressure is controlled according to the selected PCM.

2. The braking force control apparatus for the vehicle according to claim 1, wherein when the running state of the vehicle is stable, the vehicle is not turning and a vehicle speed is higher than a reference value, the ECU is configured to select the PCM using equation 1, and
   control the upstream braking actuator so that the common upstream pressure is controlled according to the selected PCM.

3. The braking force control apparatus for the vehicle according to claim 1, wherein the upstream braking actuator includes a hydraulic pressure supply source, master cut valves, and an upstream pressure control valve in addition to the master cylinder device, and the upstream pressure control valve is configured to supply hydraulic liquid from the hydraulic pressure supply source to the downstream braking actuator, thereby controlling the common upstream pressure in the pressure increasing mode when the prescribed control mode is the pressure increasing mode, to control the common upstream pressure in the pressure holding mode by shutting off a communication between the hydraulic pressure supply source and the downstream braking actuator when the prescribed control mode is the pressure holding mode, and to control the common upstream pressure in the pressure decreasing mode by discharging hydraulic liquid from the downstream braking actuator to the hydraulic pressure supply source when the prescribed control mode is the pressure decreasing mode.

4. A braking force control apparatus for a vehicle comprising:
   an upstream braking actuator that includes a master cylinder device that is driven by braking operation of a driver and generates a common upstream pressure for left and right front wheels and left and right rear wheels,
   a downstream braking actuator that individually controls braking pressures supplied to braking force generating devices of the left and right front wheels and the left and right rear wheels, and
   an electronic control unit (ECU) for controlling the upstream braking actuator and the downstream braking actuator, the ECU being configured to:
   when an anti-skid control start condition is satisfied for any of the wheels:
      control the downstream braking actuator in a pressure increasing mode, a pressure holding mode, or a pressure decreasing mode so that a degree of braking slip of a relevant wheel falls within a predetermined range until an anti-skid control ending condition is satisfied, the relevant wheel being a wheel for which the anti-skid control start condition is satisfied, and control the downstream braking actuator in a non-controlling mode so that braking pressures of wheels other than the relevant wheel become values corresponding to a braking operation amount of the driver, control the upstream braking actuator to control the common upstream pressure in the pressure increasing mode, the pressure holding mode, the pressure decreasing mode, or the non-controlling mode, and set the common upstream pressure to a pressure in the master cylinder device in the non-controlling mode, and when a specific abnormality in which the common upstream pressure is able to be supplied from the upstream braking actuator to the braking force generating devices of each wheel but a braking pressure in the braking force generating devices of any one of wheels is not able to be decreased due to a case in which a pressure decreasing valve of the any one of the wheels in the downstream braking actuator is not able to discharge brake oil into a reservoir, the ECU is further configured to:

select a control mode on a pressure increasing side, a pressure increasing side priority of selection being set in a listed order of decreasing priority: the pressure increasing mode, the pressure holding mode, the pressure decreasing mode, and the non-controlling mode, select a control mode on a pressure decreasing side, a pressure decreasing side priority of selection being set in a listed order of decreasing priority: the pressure decreasing mode, the pressure holding mode, the pressure increasing mode, and the non-controlling mode, and based upon the selected control mode on the pressure increasing side and the selected control mode on the pressure decreasing side, and when a running state of the vehicle is unstable and the vehicle is not turning, the ECU is further configured to select a prescribed control mode (PCM) using the following equation (4): PCM=DE(DE(left front wheel, right front wheel), IN(left rear wheel, right rear wheel)), based upon the selected control mode on the pressure increasing side and the selected control mode on the pressure decreasing side, and when a running state of the vehicle is unstable and the vehicle is turning, the ECU is configured to select a prescribed control mode (PCM) using the following equation (3): PCM=DE(DE (left front wheel, right front wheel), DE(left rear wheel, right rear wheel), where in evaluating the PCM equation, the ECU determines the control mode for each wheel that would reduce a possibility that stability of the vehicle deteriorates, IN means selecting the control mode on the pressure increasing side by selecting the control mode out of the control mode for the two wheels in parenthesis according to the pressure increasing side priority of selection, and DE means selecting the control mode on the pressure decreasing side out of the control mode for the two wheels in parenthesis according to the pressure decreasing side priority of selection, and control the upstream braking actuator so that the common upstream pressure is controlled according to the selected PCM.

5. A braking force control apparatus for a vehicle comprising:

an upstream braking actuator that includes a master cylinder device that is driven by braking operation of a driver and generates a common upstream pressure for left and right front wheels and left and right rear wheels, a downstream braking actuator that individually controls braking pressures supplied to braking force generating devices of the left and right front wheels and the left and right rear wheels, and an electronic control unit (ECU) for controlling the upstream braking actuator and the downstream braking actuator, the ECU being configured to:

when an anti-skid control start condition is satisfied for any of wheels:

control the downstream braking actuator in a pressure increasing mode, a pressure holding mode, or a pressure decreasing mode so that a degree of braking slip of a relevant wheel falls within a predetermined range until an anti-skid control ending condition is satisfied, the relevant wheel being a wheel for which the anti-skid control start condition is satisfied, and control the downstream braking actuator in a non-controlling mode so that braking pressures of wheels other than the relevant wheel become values corresponding to a braking operation amount of the driver, control the upstream braking actuator to control the common upstream pressure in the pressure increasing mode, the pressure holding mode, the pressure decreasing mode, or the non-controlling mode, and set the common upstream pressure to a pressure in the master cylinder device in the non-controlling mode, and when a specific abnormality in which the common upstream pressure is able to be supplied from the upstream braking actuator to the braking force generating devices of each wheel but a braking pressure in the braking force generating devices of any one of wheels is not able to be decreased due to a case in which a pressure decreasing valve of the any one of the in the downstream braking actuator is not able to discharge brake oil into a reservoir, the ECU is further configured to:

select a control mode on a pressure increasing side, a pressure increasing side priority of selection being set in a listed order of decreasing priority: the pressure increasing mode, the pressure holding mode, the pressure decreasing mode, and the non-controlling mode, select a control mode on a pressure decreasing side, a pressure decreasing side priority of selection being set in a listed order of decreasing priority: the pressure decreasing mode, the pressure holding mode, the pressure increasing mode, and the non-controlling mode, and based upon the selected control mode on the pressure increasing side and the selected control mode on the pressure decreasing side, and when a running state of the vehicle is stable, the vehicle is not turning, and a vehicle speed is equal to or lower than a reference value, the ECU is configured to select a prescribed control mode (PCM) using the following equation (2): PCM=IN(IN(left front wheel, right front wheel), IN(left rear wheel, right rear wheel)), where in evaluating the PCM equation, the ECU determines the control mode for each wheel that would reduce a possibility that stability of the vehicle deteriorates, IN means selecting the control mode on the pressure increasing side by selecting the control mode out of the control mode for the two wheels in parenthesis according to the pressure increasing side priority of selection, and DE means selecting the control mode on the pressure decreasing side out of the control mode for the two wheels in parenthesis according to the pressure decreasing side priority of selection, and control the upstream braking actuator so that the common upstream pressure is controlled according to the selected PCM.

* * * * *